United States Patent
Sergoyan et al.

(10) Patent No.: US 6,954,064 B2
(45) Date of Patent: Oct. 11, 2005

(54) METHOD AND APPARATUS FOR MEASURING A THICKNESS OF A NONCONDUCTIVE COATING AND CALIBRATING A THICKNESS MEASUREMENT GAUGE

(75) Inventors: Edward G. Sergoyan, Mill Creek, WA (US); Ronald A. Bradley, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/307,685

(22) Filed: Dec. 2, 2002

(65) Prior Publication Data

US 2004/0104725 A1 Jun. 3, 2004

(51) Int. Cl.[7] .............................................. G01N 27/82
(52) U.S. Cl. ....................... 324/240; 324/238
(58) Field of Search ................ 324/240, 238, 324/28, 262, 261, 230; 73/431

(56) References Cited

U.S. PATENT DOCUMENTS

| | | | |
|---|---|---|---|
| 3,861,559 A | * | 1/1975 | McCormick ................ 220/664 |
| 4,000,459 A | | 12/1976 | Little |
| 4,373,398 A | * | 2/1983 | Ponczek ...................... 73/738 |
| RE35,703 E | | 12/1997 | Koch et al. |
| 5,777,469 A | * | 7/1998 | Hockey et al. ............. 324/240 |
| 5,847,562 A | * | 12/1998 | Fulton et al. ............... 324/229 |
| 6,243,661 B1 | | 6/2001 | Baldwin et al. |

OTHER PUBLICATIONS

Kaman Instrumentation Operations. KDM–8200 Instruction Manual; Part No. 860059–001, Rev. F; Colorado Springs, CO, Copyright 2000, pp. 1–54.

* cited by examiner

*Primary Examiner*—Bot Ledynh
*Assistant Examiner*—Reena Aurora
(74) *Attorney, Agent, or Firm*—Alston & Bird LLP

(57) ABSTRACT

A method and apparatus are provided for measuring a thickness of a nonconductive coating disposed over portions of first and second conductive surfaces that intersect at an intersection angle. The apparatus is a thickness measurement gauge having an eddy current sensor. The thickness measurement gauge includes an eddy current sensor and electronic analyzer. The thickness gauge may be provided with a pressure enclosure. A method of calibrating a thickness measurement gauge and a calibration stand are also provided. The calibration stand has third and fourth conductive surfaces intersecting at the intersection angle. The conductivities of the third and fourth surfaces correspond to the conductivities of the first and second surfaces.

27 Claims, 8 Drawing Sheets

METHOD AND APPARATUS FOR MEASURING A THICKNESS OF A NONCONDUCTIVE COATING AND CALIBRATING A THICKNESS MEASUREMENT GAUGE

FIELD OF THE INVENTION

This invention relates to coating thickness measurement gauges, and, more particularly to an eddy current thickness gauge for measuring nonconductive coatings, a method of measuring a nonconductive coating at an intersection with an eddy current thickness gauge, and methods and apparatuses for calibrating an eddy current thickness gauge.

BACKGROUND OF THE INVENTION

Nonconductive coatings are applied at intersections of materials, typically in the form of a fillet seal for purposes of enclosing and sealing the intersection. Often these coatings are required to attain a minimum thickness. In many cases, these coatings can shrink by as much as 20% as they dry. As such, what appears to be an adequate coating thickness may later shrink to less than a minimum thickness. In the aerospace industry, quality assurance programs have been developed to inspect coatings and fillet seals on aircraft to ensure that they achieve minimum desired thicknesses.

For example, one sealant, BMS5-26, Type II, Integral Fuel Tank Sealant, is used to coat intersections of an airplane wing. In many aircraft, the wing is also the support structure for an internal bladder fuel tank, and it is therefore important to seal intersections and gaps. The sealant must be applied to any intersection to prevent a leak path. The sealant is typically applied to the border of all electrical pass-through brackets, all fasteners, and along the faying surface of the web and skin. The greatest amount of sealant is applied along the intersection of the heavy longerons and the wing skin.

When inspecting the sealant coatings at these intersections, quality assurance inspectors attempt to determine the minimum thickness of a coating. Unless coupled with a destructive test, nondestructive visual inspections are often not adequate. One test requires removing the sealant and physically measuring the thickness, from the radius of a concave fillet to the intersection of the web and skin. The physical measurement of the destroyed seal may then provide a rough visual reference for performing a visual inspection of the remaining sealant. These tests are based upon the visual perception of the inspector.

This procedure has several drawbacks. For one, visual inspections introduce subjective reproducibility errors. Also, the destroyed section must be repaired by having a coating seal reapplied. Consequently, the repaired area is not as structurally contiguous as the original seal. Also, additional labor is required to perform the destructive test and subsequently reapply the sealant. In the case of hard to reach areas, visual assessment is made based on experience. When an inspector is not convinced that a proper amount of sealant has been applied, they may insist that sealant be reapplied. Reapplication of sealant, therefore, also increases labor.

As such, there has not been an adequate non-destructive method for determining minimum coating thickness requirements. Therefore, there is a need in the art for a portable nondestructive coating thickness measurement gauge capable of measuring coating thicknesses at intersections, such as a fillet seal.

BRIEF SUMMARY OF THE INVENTION

According to one embodiment of the present invention, a method of measuring a thickness of a nonconductive coating is provided. The coating is applied over portions of a first surface and a second surface that intersect at an intersection angle. The method measures the coating with a thickness measurement gauge having an eddy current sensor. One step of the method comprises placing the eddy current sensor in contact with at least a portion of the coating at a predetermined angular orientation with respect to the first and second surfaces. The angular orientation is non-perpendicular and non-parallel to both the first and second surfaces. The method also includes determining a measurement output of the thickness measurement gauge, which is based on the first and second conductivities of the first and second surfaces, respectively. From the output, the method includes determining a thickness of the nonconductive coating.

One aspect of the step of determining a thickness further comprises comparing the measurement output to a predetermined output. This comparison may be a pass/fail tolerance corresponding to the difference between the measurement output and the predetermined output.

Another embodiment of the present invention includes a method of calibrating a thickness measurement gauge having an eddy current sensor. The eddy current sensor may be used to measure a thickness of a nonconductive coating disposed over a first surface and a second surface that intersect at an intersection angle. The first and second surfaces have first and second conductivities, respectively. The method includes placing the eddy current sensor at a predetermined angular orientation with respect to third and fourth surfaces that intersect at the same intersection angle. The third and fourth surfaces have third and fourth conductivities corresponding to the first and second conductivities, respectively. The method includes positioning the eddy current sensor at a predetermined distance with respect to the third and fourth surfaces and calibrating to a predetermined output based on the third and fourth conductivities.

An aspect of the method of calibration includes inserting a nonconductive coating at the intersection of third and fourth surfaces prior to performing the step of calibrating. The nonconductive coating may, in some cases, include a nonconductive coating comprised of the same material as the nonconductive coating between the first and second surfaces. Additionally, the nonconductive coating may comprise a coating of a thickness corresponding to a minimum desired coating thickness for the coating on the first and second surfaces. Another aspect of the method of calibrating includes positioning the eddy current sensor in contact with at least a portion of the nonconductive coating.

Another embodiment of the present invention comprises a thickness measurement gauge. The thickness measurement gauge includes a sensor housing defining a first sidewall on the exterior of the housing. The first sidewall permits the housing to abut a first surface proximate to a measurement area. An eddy current sensor is disposed in the housing and defines a longitudinal axis of measurement corresponding to magnetic fields generated by the eddy current sensor. Generally, the axis of measurement is at a non-perpendicular angle to the first sidewall.

Various aspects of the thickness measurement gauge include a housing having a second sidewall that permits the housing to abut a second surface proximate to the measurement area. As such, the eddy current sensor is disposed between first and second sidewalls such that the axis of measurement is at a non-perpendicular angle to the second sidewall. In one embodiment, the eddy current sensor is disposed between the first and second sidewalls such that the axis of measurement is at a similar angle with respect to both first and second sidewalls. As used herein, "similar" is used in its mathematical sense designating corresponding angles that are equal. In one case, the first and second sidewalls are perpendicular to each other and permit the sidewalls to abut perpendicular intersection surfaces.

The eddy current sensor may be electrically interconnected to an electronic analyzer. The electronic analyzer is adapted to analyze an electrical signal from the eddy current sensor corresponding to a distance from a conductive surface. According to one aspect of the measurement gauge, the electronic analyzer is independent of the housing and permits the sensor and sensor housing to be placed in narrow areas. The electronic analyzer may also further comprise a calibration circuit. For example, several commercially available electronic analyzers include linearity, zero crossing, and gain adjustments to permit the output of the electronic analyzer to be adjusted to a predetermined output.

Another embodiment of a thickness measurement gauge includes a pressure enclosure housing an electronic analyzer. The pressure enclosure is hermetically sealed to permit a pressure within the enclosure to exceed ambient pressure. An eddy current sensor is disposed in a housing and electrically interconnected through the pressure enclosure to the electronic analyzer. As such, an explosive resistant thickness measurement gauge is provided.

The pressure enclosure may also include an electrical connector hermetically sealed about the pressure enclosure to permit connection between the electronic analyzer and sensor by way of a lead. Other connectors through the enclosure are similarly hermetically sealed and may include other electrical connectors and also pneumatic connectors. For example, valve connections, pressure relief, pressurization connections, and display connections through the pressure enclosure, if provided, may include hermetic seal to permit a positive pressure inside the enclosure. In one case, one pneumatic connection is a Schrader valve that permits the enclosure to be pressurized by commonly available air hoses and pumps.

Other aspects of an embodiment having a pressure enclosure may include a power source for energizing the electronic analyzer, such as a battery disposed within the pressure enclosure. This embodiment therefore permits a pressure switch to be electrically interconnected between the power source and the electronic analyzer. As such, the pressure switch can disconnect the electronic analyzer and power source upon pressure within the pressure enclosure falling below a predetermined threshold. Therefore, the explosion resistance of the pressure enclosure is maintained.

Another embodiment of the present invention includes a calibration stand for calibrating a thickness measurement gauge including an eddy current sensor. The eddy current sensor is calibrated to measure a thickness of a nonconductive coating disposed over portions of a first and second surface that intersect at an intersection angle. The first and second surfaces have first and second conductivities, respectively. The calibration stand includes an eddy current sensor holder. Opposed to the eddy current sensor holder is a calibration block having third and fourth surfaces intersecting at the same intersection angle. The third and fourth surfaces lie at a predetermined angular orientation with respect to the sensor holder. The third surface has a third conductivity corresponding to the first conductivity, and the fourth surface has a fourth conductivity corresponding to the second conductivity. A positioner linearly translates the eddy current sensor holder toward and away from the calibration block, and may include a micrometer gauge corresponding to the linear distance between the sensor and the calibration block.

BRIEF DESCRIPTION OF THE SEVERAL VIEWS OF THE DRAWINGS

Figure 1:
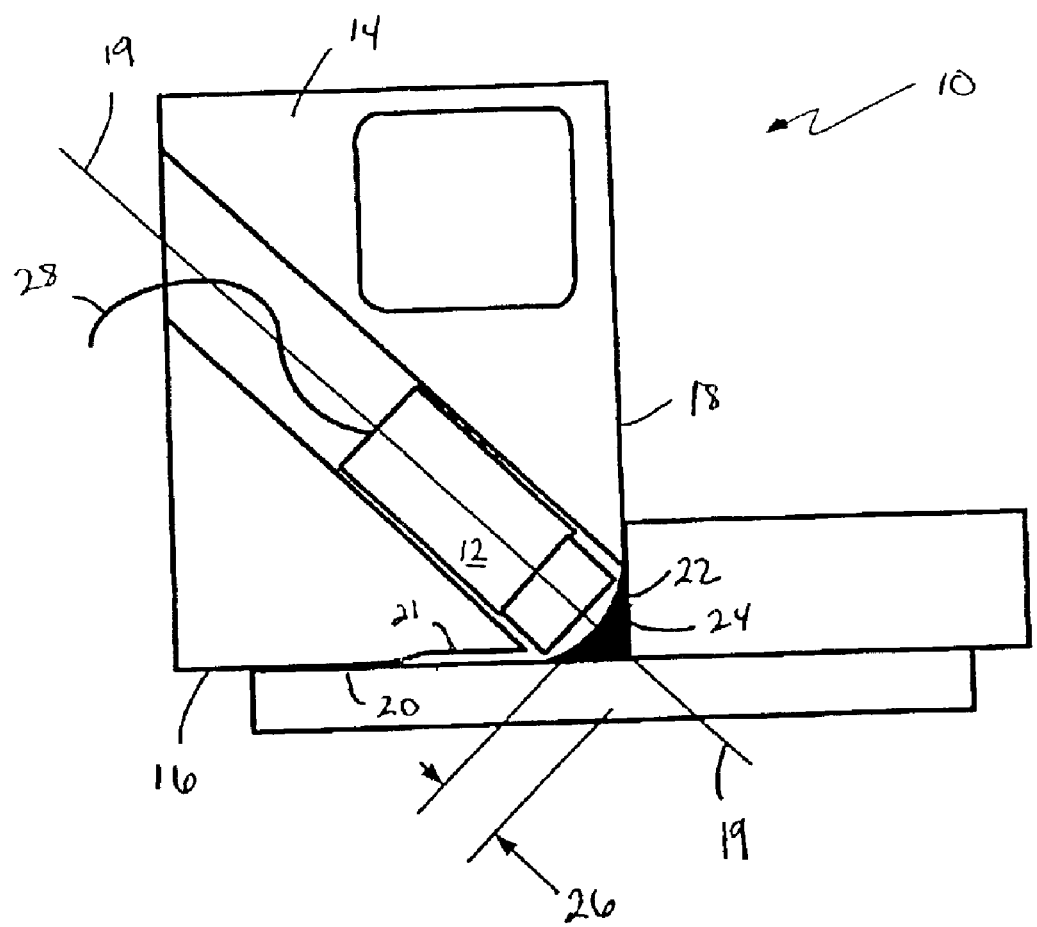
Figure 2:
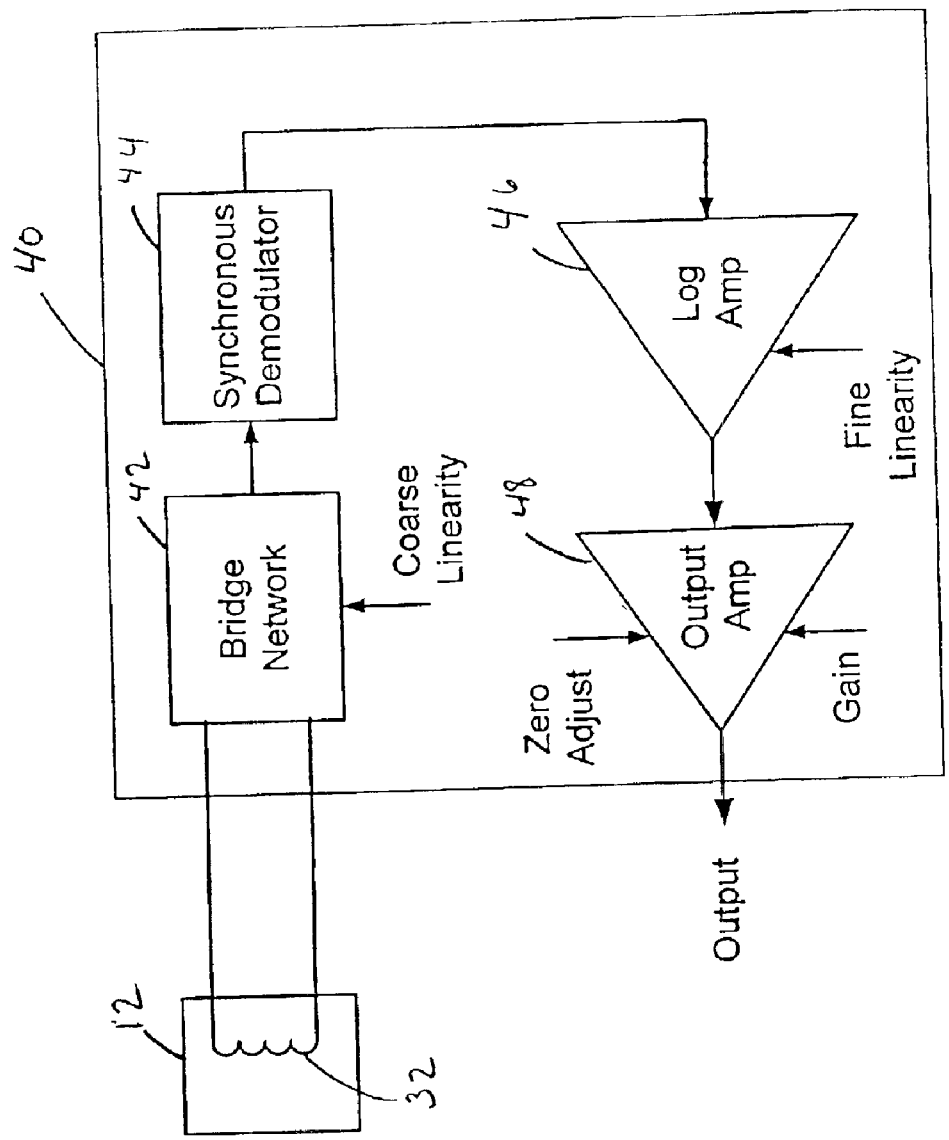
Figure 3:
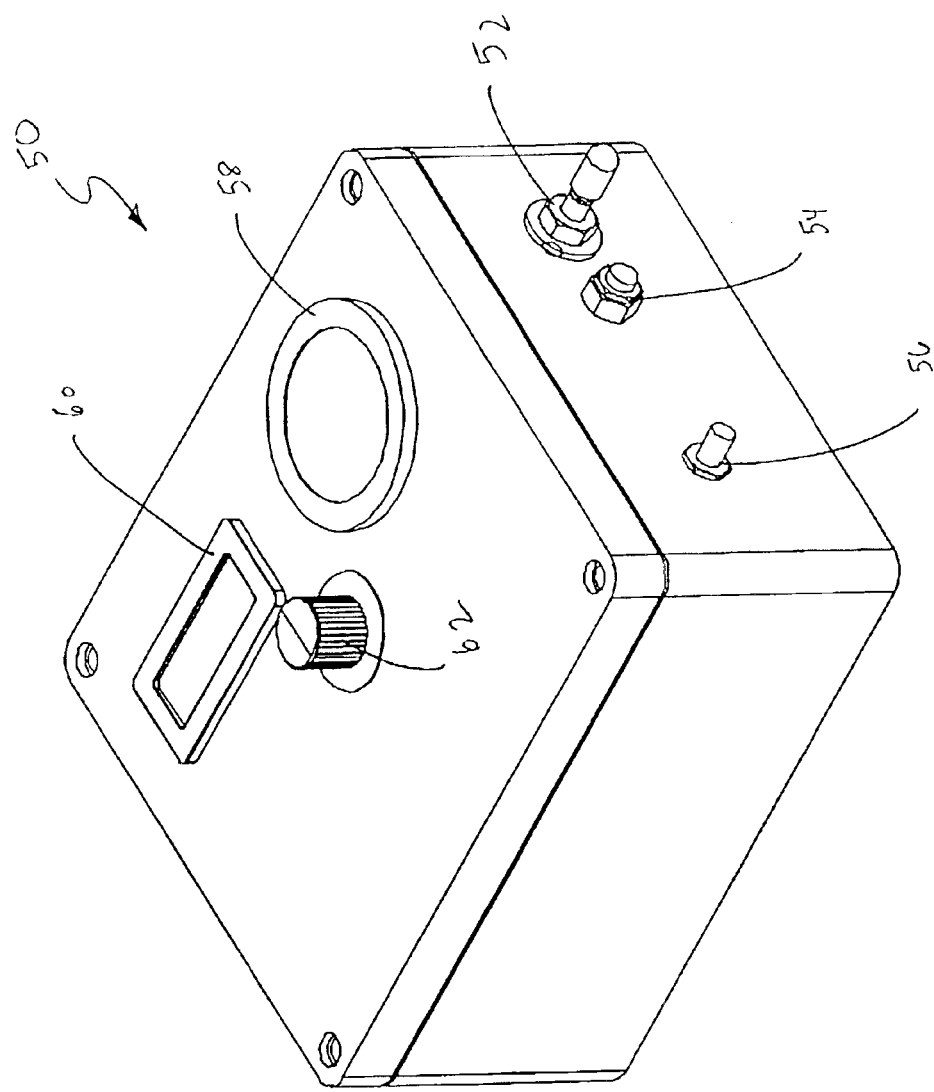
Figure 4:
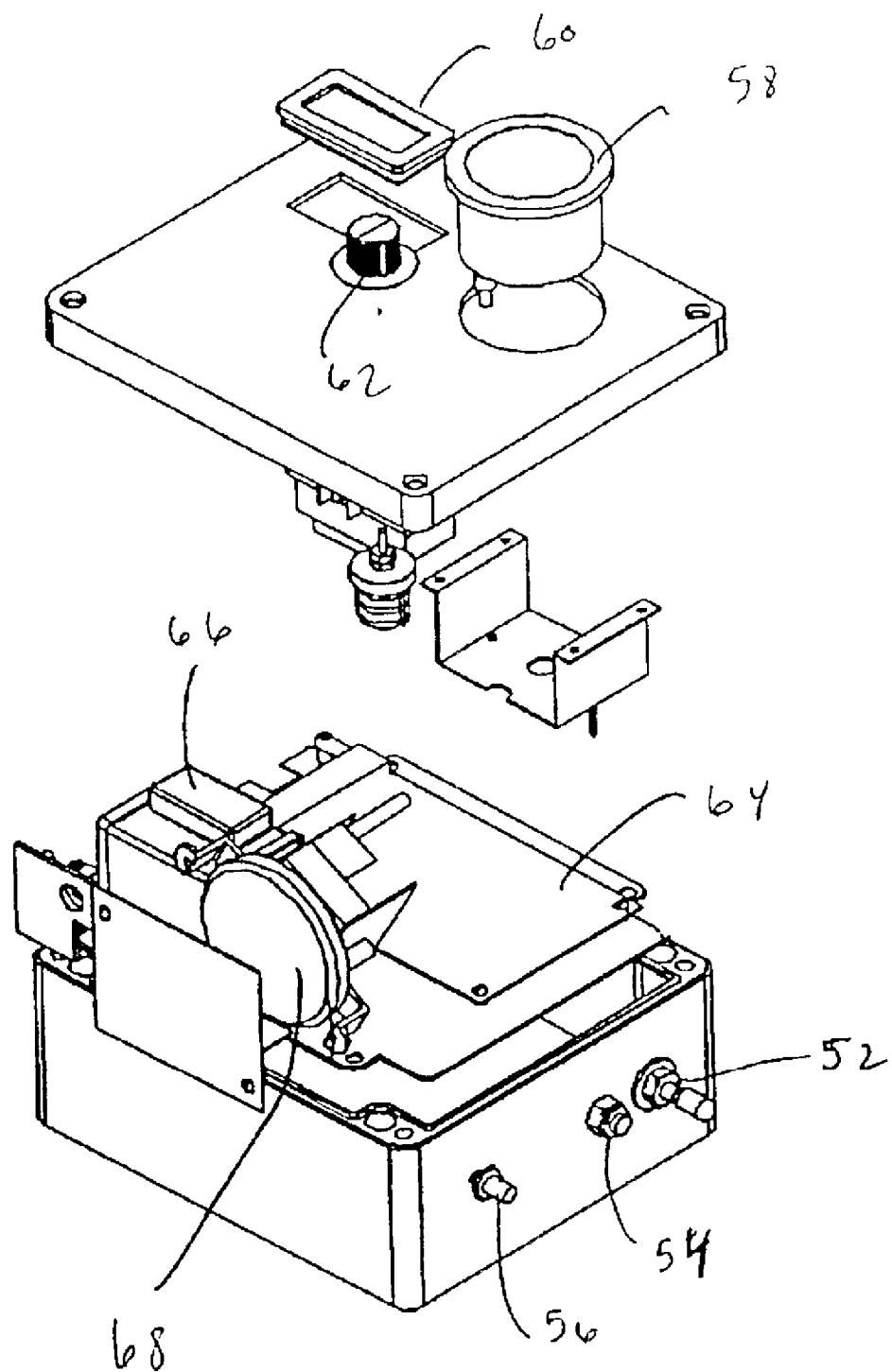
Figure 5:
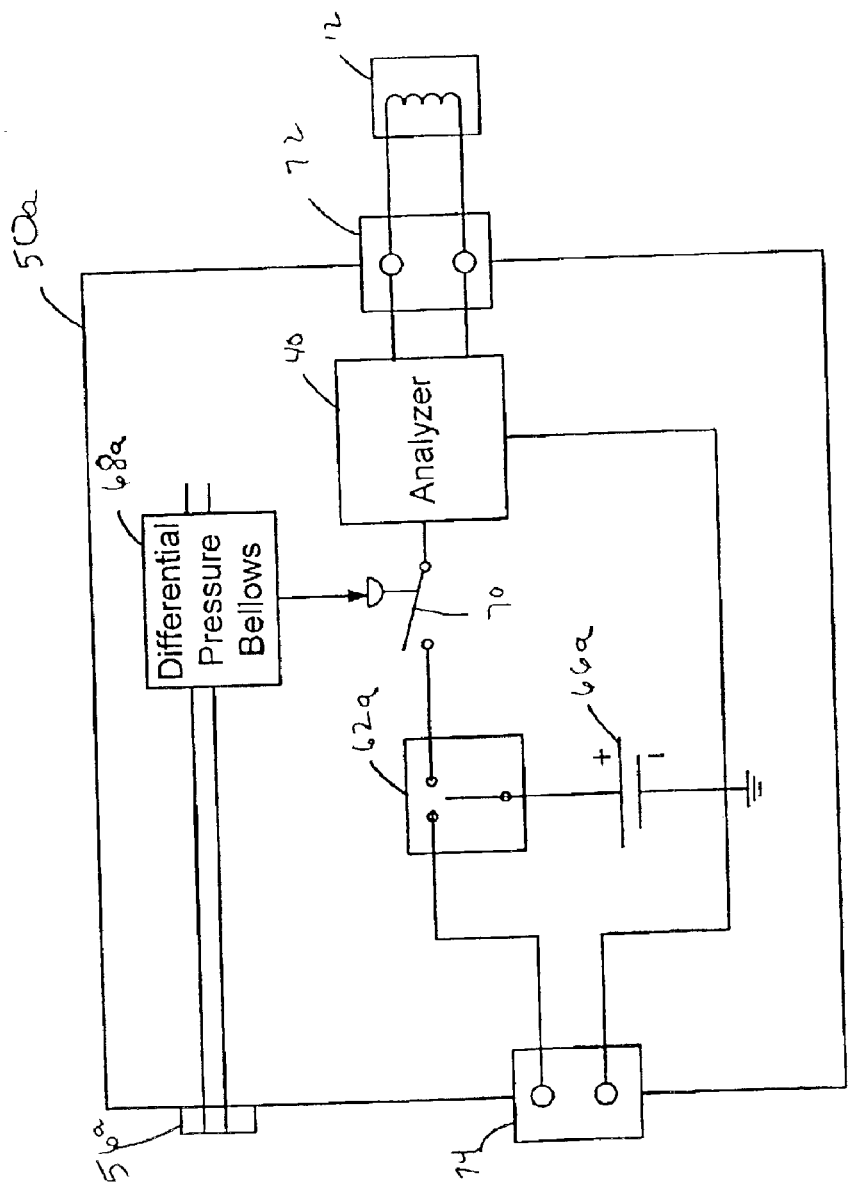
Figure 6:
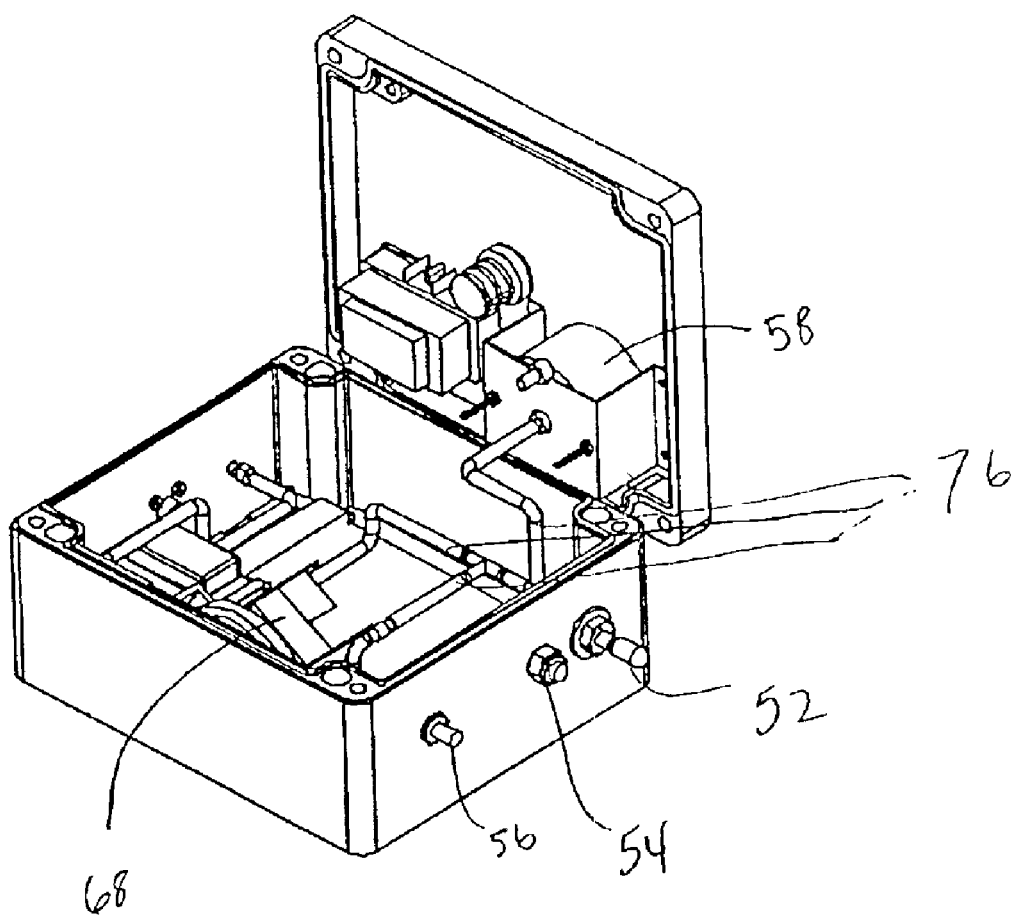
Figure 7:
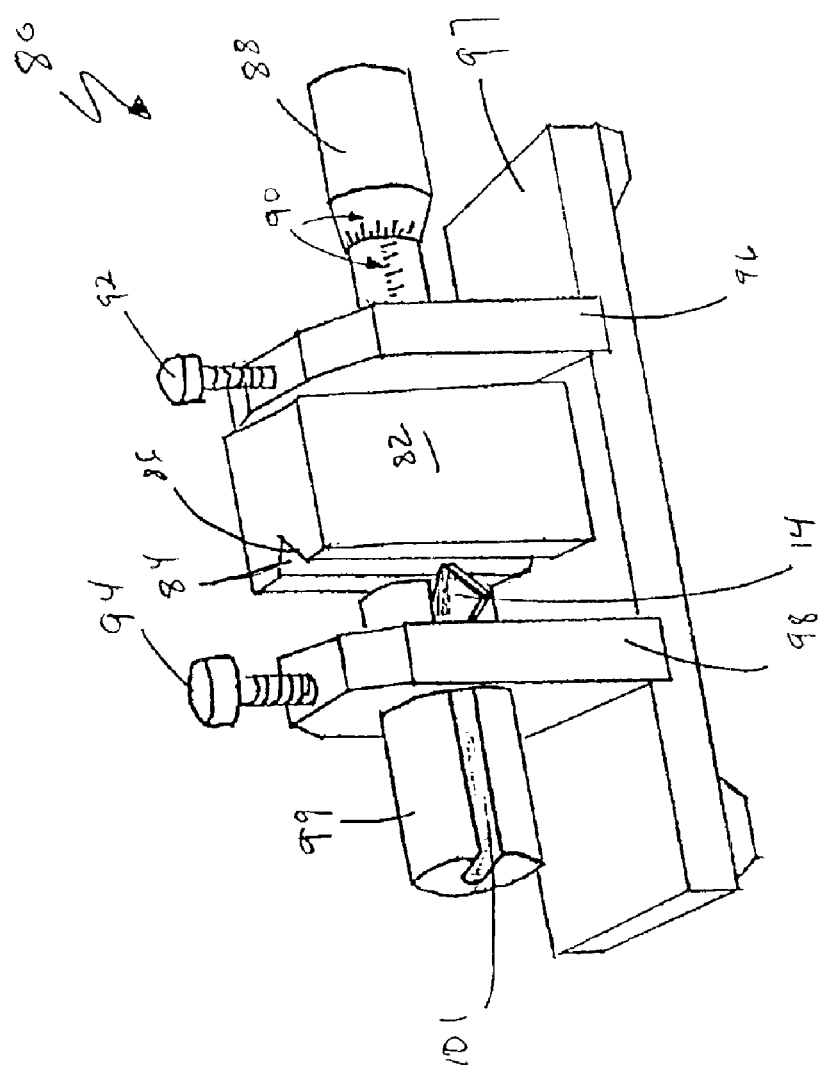
Figure 8:
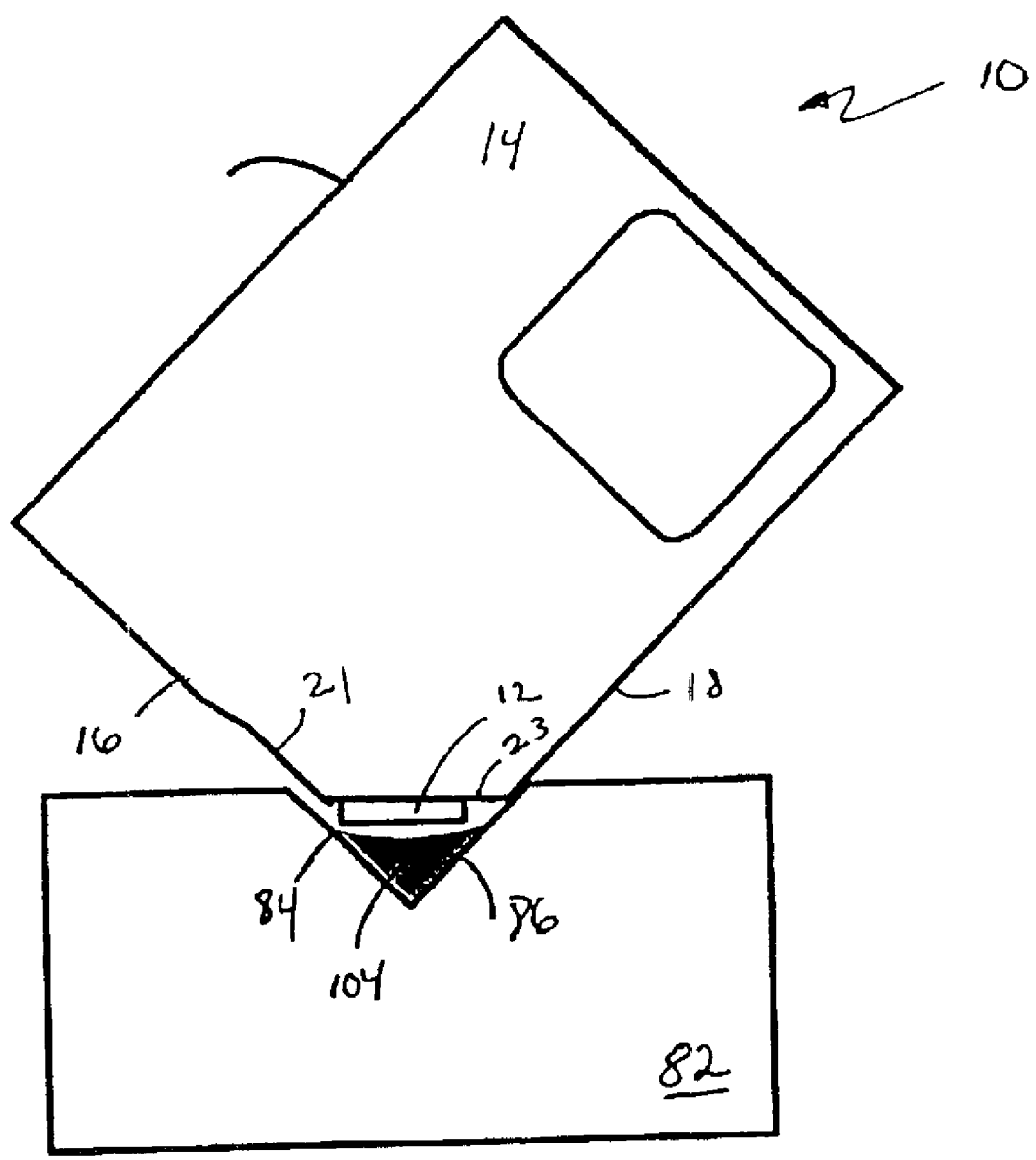

Having thus described the invention in general terms, reference will now be made to the accompanying drawings, which are not necessarily drawn to scale, and wherein:

FIG. 1 is cross section of a thickness measurement gauge abutting first and second surfaces according to one embodiment of the present invention;

FIG. 2 is a block diagram of the operation of a thickness measurement gauge according to one embodiment of the present invention;

FIG. 3 is a perspective of a thickness measurement gauge pressure enclosure according to one embodiment of the present invention;

FIG. 4 is an exploded view of a thickness measurement gauge pressure enclosure according to one embodiment of the present invention;

FIG. 5 is a block diagram of the operation of a pressure enclosure and thickness measurement gauge according to one embodiment of the present invention;

FIG. 6 is a perspective view illustrating the pneumatic connections of the pressure enclosure according to one embodiment of the present invention;

FIG. 7 is a calibration block for a thickness measurement gauge according to one embodiment of the present invention; and FIG. 8 is a thickness gauge positioned relative to a v-block for calibrating the thickness measurement gauge according to one embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1 and according to one embodiment of a thickness measurement gauge 10, an eddy current sensor 12 is disposed within a sensor housing 14. The eddy current sensor 12 is typically used to measure coating thicknesses. One application of the thickness measurement gauge 10 includes measuring a nonconductive coating 24, covering a portion of the intersection of two conductive surfaces 20, 22 such as a fillet seal depicted in FIG. 1. While the following embodiments are described in conjunction with a fillet seal, the invention may be used to measure the thickness of any nonconductive coating over any of two intersecting conductive surfaces and is not limited to sealants or sealing materials.

The sensor housing 14 also comprises at least one sidewall 16, and, in this embodiment, a first sidewall 16 and a second sidewall 18. The first and second sidewalls 16, 18 permit the sensor housing 14 to be placed proximate to a measurement area at the intersection of first and second conductive surfaces 20, 22. As such, the first sidewall 16 may abut the first conductive surface 20, and the second sidewall 18 may abut the second conductive surface 22. Alternatively, the sidewalls may permit the sensor housing to abut other surfaces proximate the measurement area so long as the angular orientation of the sensor with respect to the intersection is maintained. The angular orientation is discussed in more detail below.

The eddy current sensor 12 is disposed along a measurement axis 19, which is non-parallel to and at non-perpendicular angles to first and second sidewalls 16, 18. The measurement axis 19 corresponds to the major axis of the magnetic field density generated by the eddy current sensor 12. The eddy current sensor 12 generates a magnetic field that induces an eddy current in the first and second conductive surfaces 20, 22. The eddy currents intensities are related to the conductivities of the surfaces 20, 22 and the distance from which the eddy current sensor is positioned away from each surface. The eddy currents induced in first and second conductive surfaces 16, 18, therefore, produce an opposing magnetic field, which are sensed by a magnetic coil on the sensor. Because of the generated magnetic fields, it is also advantageous that the sensor housing 14 be made of a nonconductive material in order to adequately prevent interfering eddy currents and magnetic fields.

It has been determined that the resultant magnetic fields (a vector sum of the original magnetic field and the opposed magnetic fields generated by the eddy currents), and thus the output from the sensor 12, vary according to the distance of the eddy current sensor 12 to the intersection of the first and second conductive surfaces 20, 22. Over a range of distance from the intersection, it is possible to calibrate the eddy current sensor 12 and associated circuitry to linearly approximate the output on the sensor 12, that is, to have an output that varies linearly with the distance to the intersection. To this end, the thickness measurement gauge 10 of this embodiment may be used to determine the distance from the intersection to the eddy current sensor 12. In practice, this may be used to determine the thickness 26 of a nonconductive coating 24, such as a sealant, placed over the intersection. It should be noted that the conductivities of the first and second conductive surfaces 20, 22 need not necessarily be the same, however, it is expected that the conductivities will be within a range of each other so that the conductivity of one conductive surface is not effectively negligible compared to the other conductive surface.

One embodiment of a sensor 12 that may be disposed within the sensor housing is a Kaman 9C manufactured by the Kaman Corporation, Kaman Instrumentation Operations, Measuring Systems Group, Colorado Springs, Colo. An electronic analyzer, the Kaman KDM-8200 circuit board, controls the 9C sensor. The operation, set-up, and calibration of the sensor and Kaman KDM-8200 are further explained in KDM-8200 Instruction Manual, Part No. 860059-001 Rev. F, the teachings of which are hereby incorporated by reference. While the embodiments herein illustrate an electronic analyzer and sensor consistent with the Kaman 9C and KDM-8200, many other eddy current sensor and associated electronic analyzers are available and may be substituted accordingly.

Referring to FIG. 2 and for purposes of illustration, the Kaman 9C electronic analyzer 40 includes a sensor coil 32, and KDM-8200 includes a bridge network 42, synchronous demodulator 44, log amp 46, and output amp 48. An AC current is provided to the sensor coil 32 by the balanced bridge network 42. As a result, the sensor coil 32 generates a magnetic field. The coil 32 is positioned such that the longitudinal axis of the sensor corresponds to the measurement axis 19 from FIG. 1. When placed at a distance from two intersecting conductive surfaces 20, 22, the magnetic field induces eddy current in each surface. The eddy current in the conductive surfaces 20, 22 generates opposing magnetic fields, reducing the intensity of the original magnetic field. Therefore, the impedance of the sensor coil 32 is varied and output voltage is proportional to the distance from the intersection of the conductive surfaces 20, 22.

The sensor coil 32 is controlled by the balanced bridge network 42 adapted to sense the change in impedance. About a range of distance from the intersection of the first and second surfaces 16, 18, the balanced bridge network 42 may be calibrated so that the sensor coil impedance represents a linear approximation of the distance. The electronic analyzer 40 includes signal conditioning components, such as a synchronous demodulator 44, log amp converter 46, and output amplifier 48 that permit calibration of the sensor to a desired linearity or slope, gain, and zero crossing as is known to one of ordinary skill in the art. This embodiment is illustrative of the general functions of the KDM-8200, however, other electronic analyzers are known to those of ordinary skill in the art and may be substituted accordingly.

In many embodiments, a coating need only attain a minimum thickness, and the thickness measurement gauge may be used with a pass/fail test to ascertain whether the thickness 26 achieves the minimum thickness. For example, the thickness gauge 10 may be calibrated to a desired output corresponding to a distance of the sensor 12 from the intersection of the conductive surfaces 16, 18 corresponding to a minimum thickness. When the sensor 12 is placed proximate the intersection of first and second surfaces 16, 18 and in contact with a portion of the coating 24, the output may be compared to the calibrated output for a predetermined distance. For an output with a positive slope with respect to distance, any reading less than the calibrated reading would suggest the thickness 26 is less than the required minimum, and thus a fail. Otherwise the test is a pass since the thickness would be more than the predefined acceptable minimum. Additional methods of determining thickness 26 of a nonconductive coating are described in more detail below.

Referring back to FIG. 1 and according to this embodiment of a thickness measurement gauge 10, the sensor housing 14 comprises a first sidewall 16 disposed on one side of the sensor 12. The first sidewall 16 permits the sensor housing to rest against a surface 20 proximate to the measurement area. At least one sidewall is required of the sensor housing 14 so that the sensor can be placed against a surface proximate a measurement area and over a portion of the intersection of first and second surfaces 20, 22. According to this embodiment, a second sidewall 18 is provided so that the sensor holder 14 may be firmly placed between both first and second surfaces 20, 22. The first and second sidewalls 16, 18 are disposed on opposed sides of the sensor 12 to permit the sensor housing 14 to abut at least one of the conductive surfaces 20, 22, and in this embodiment both first and second conductive surfaces 20, 22. In numerous applications, the first and second conductive surfaces 20, 22 are often perpendicular to one another, and therefore the first and second sidewalls 16, 18 of the sensor housing are perpendicular to one another. Other embodiments may permit a variety of angles and the first and second sidewalls should be angled in order to effectively permit at least one and, more advantageously, both sidewalls to abut a surface proximate a measurement area over a portion of the intersection.

As can be seen in FIG. 1, the first sidewall 16 includes a recessed portion 21 permitting the housing to recede inwardly toward the sensor 12. Additionally, the first and second sidewalls may converge at a beveled corner 23 (not shown in the cross section but more fully illustrated in FIG. 8). The beveled corner is generally parallel to and slightly larger than the end of the sensor 12. The combination of the recessed portion and beveled corner, therefore, permits the sensor 12 to contact a portion of the coating during measurement. Also, according to this embodiment, the sensor 12 is disposed between the sidewalls 16, 18 such that the measurement axis 19 is disposed at a similar angle to each sidewalls 16, 18. Having the measurement axis 19 at similar maximize the effectiveness of the magnetic field along the first and second surfaces 20, 22. As used herein, "similar" is used in its mathematical sense designating corresponding angles that are equal.

As described in this particular embodiment, the sensor 12 is disposed in a sensor housing 14 and the electronic analyzer 40 is disposed independent of and remote from the sensor housing. An analyzer, such as the KDM-8200, is typically disposed on a large circuit board, and therefore is incapable of being inserted into small and confined areas where measurements are taken. Consequently, an independent electronic analyzer 40 permits the sensor housing 14 to be as small as possible to hold the desired sensor and be able to fit in narrow and confined spaces. In aircraft manufacture, for example, the intersection of a wing skin and longeron provides narrow and difficult to reach areas, and a smaller sensor and sensor housing provide increased capability to reach and measure these areas. As such, the sensor 12 may be interconnected to the analyzer via a lead 28. As used herein, when a device or element is "interconnected" to another device or element, it may be directly connected, attached, or connected by one or more intervening devices or elements. Not all intersections are in confined areas however, and therefore the electronic analyzer need not be independent of and remote from the sensor housing in all embodiments.

Referring concurrently to FIGS. 3 and 4, another embodiment of a thickness measurement gauge includes a circuit card 64 having an electronic analyzer 40, which is disposed in a hermetically sealed pressure enclosure 50. An eddy current sensor, such as the one described above, disposed in a housing, may be externally connected through the pressure enclosure 50 via a lead. The pressure enclosure 50 is hermetically sealed to permit a positive air pressure to be maintained inside. The pressure enclosure 50 also includes associated circuitry including a battery 66, and displays 58, 60 on the exterior of the enclosure. The displays 58, 60 and other interconnections through the pressure enclosure 50 are also hermetically sealed.

The hermetically sealed embodiment of a thickness gauge pressure enclosure, therefore, permits the thickness gauge to be used in explosive environments. For example, in aircraft manufacture, aromatic polymer sealants (described above in the background section) release flammable and explosive vapors. In order to avoid electrical spark in the area of the sealant, particularly in confined and poorly ventilated areas such as inside an airplane wing, the hermetically sealed thickness gauge provides an explosion resistant device. Because of the ability to maintain a positive pressure, the pressure enclosure 50 prevents any vapors from the sealant entering through the openings and interconnections, thus reducing the chance of a spark igniting the vapor. In this particular embodiment, it was found that approximately 4 inches of water or 0.15 psi of positive differential air pressure was sufficient for adequate explosion resistance. While air was used in this embodiment, it is contemplated that inert gasses may be used to pressurize the pressure enclosure and may be substituted accordingly.

This embodiment of a thickness gauge having a hermetically sealed pressure enclosure 50 includes a power switch 62, an electronic analyzer output display 60, and a pressure gauge 58. The pressure gauge 58 provides a measure of the pressure on the inside of the pressure enclosure 50 so that an operator may visually inspect the pressure enclosure 50 to ensure a positive pressure is maintained. The pressure enclosure 50 also includes several pneumatic devices including a pressurization valve 52, which in this embodiment is a Schrader valve. A Schrader valve advantageously permits common commercial air pumps to pressurize the inside of the pressure enclosure 50. Also included in this embodiment is a manual pressure relief valve 54 that permits releasing the positive pressure from the pressure enclosure. Alternatively, an automatic pressure relief valve may be provided to prevent overpressurization of the pressure enclosure, or both an automatic and manual relief may be used in combination.

As previously stated, the pressure enclosure 50 includes a circuit board 64 containing an electronic analyzer 40, such as the previously described KDM-8200. FIG. 5 provides a block diagram illustrating the electronic analyzer 40 disposed in the pressure enclosure 50a, and like numbers identifying functional blocks correspond to the physical illustrations of FIG. 4. Also included within the pressure enclosure 50, 50a is a battery pack 66, 66a for providing power to the electronic analyzer 40. According to this embodiment, the battery pack 66, 66a may be rechargeable and thus having an interconnection 74 through the pressure enclosure 50, 50a to allow the battery 66, 66a to be periodically recharged. The power switch 62, 62a is therefore a multi-position switch that permits the battery 66, 66a to be charged or provides power to the electronic analyzer 40. While a rechargeable battery is described in conjunction with one embodiment, it is contemplated that various other power sources, consistent with electronic analyzer manufacturer's specifications, may be used including non-rechargeable batteries, replaceable batteries, and external AC or DC power sources without resulting in a change to the basic function of a thickness gauge described herein.

A differential pressure bellows 68, 68a and a differential pressure switch 70 are also disposed within this embodiment of a thickness gauge. The differential pressure bellows 68, 68a senses the pressure difference between the atmosphere external to the pressure enclosure 50, 50a through a pneumatic bulkhead fitting 56, 56a and internal to the pressure enclosure. The bellows 68, 68a controls the pressure switch 70. The pressure switch 70 is connected in series with the battery pack 66a, power switch 62a, and electronic analyzer 40. A predetermined pressure threshold may be established, below which the pressure switch disconnects power to the electronic analyzer 40. As the pressure in the pressure enclosure drops below the predetermined threshold, there is a reduced ability to avoid potentially explosive vapors from entering the pressure enclosure 50. Therefore, the pressure switch provides an interlock to minimize any explosion hazard while operating the thickness gauge.

As illustrated in FIG. 6, one embodiment of the pressure enclosure also includes internal tubing 76 interconnecting the various pneumatic devices. One connection provides the external ambient pressure through a pneumatic bulkhead fitting 56 to the differential pressure bellows 68. Similarly, the pressure gauge is provided with a tubing interconnection 76 from an external pneumatic bulkhead 56 fitting.

As illustrated in FIG. 7, a calibration stand 80 for calibrating a thickness gauge is also provided. In this embodiment the calibration stand includes a v-block 82 having third and fourth conductive surfaces 84, 86. The third and fourth conductive surfaces 84, 86 have conductivities corresponding to the conductivities of the first and second conductive surfaces 20, 22, respectively. As such, the sensor disposed in a sensor housing 14 may be placed in the calibration stand so that the axis of measurement is at the same orientation with respect to third and fourth surfaces 84, 86 as the axis of measurement will be oriented to first and second surfaces 20, 22, as previously described. As shown in this embodiment, the v-block 82 is a single piece and thus third and fourth surfaces 84, 86 have the same conductivity. As is often the case, first and second surfaces 20, 22 may be the same material with equivalent conductivities, and therefore this embodiment of a v-block is advantageous for calibrating the sensor for first and second surfaces of similar materials. When first and second surfaces 20, 22 comprise dissimilar materials and conductivities, other v-blocks having dissimilar conductive third and fourth surfaces may be substituted accordingly.

According to this embodiment, the calibration stand also comprises a sensor holder 99. A flange 98 attached to base 97 supports the sensor holder 99. The sensor holder 99 is set into position within the flange 98 by a setscrew 94. Another flange 96 attached to the base 97 supports the v-block 82. A setscrew 92 fastens the v-block 82 to the flange 96 and a positioning device 88. The positioning device 88 is a linear positioning screw with micrometer gauge 90 corresponding to the linear distance of the positioner 88. As such, the v-block 82 is linearly positioned with respect to the sensor holder 99 by turning the positioner 88 to the desired distance. It will be appreciated, however, that other positioners may be used to effectively position the sensor housing 14 and sensor 12 in the desired orientation with respect to the third and fourth surfaces 84, 86 of the v-block 82 without departing from the spirit or scope of the present invention. For example, the positioner 88 may be adapted on the opposed flange to position the sensor while holding the v-block 82 fast. Other embodiments may use measurement devices other than micrometers 90 to effectively assure the distance and orientation of the sensor holder 99 with respect to the v-block 86. Similarly, support devices other than flanges may be used to support a sensor holder and the v-block.

The sensor holder 99 is adapted to hold a sensor housing 14 having an eddy current sensor 12 disposed therein. The sensor holder of this embodiment is a cylinder having an opening 101 defined on one side. The opening 101 permits the sensor housing 14 to be securely placed within the sensor holder 99 for calibration. As such, this embodiment permits the eddy current sensor 12 to be calibrated in a calibration stand 80, such as the one described above, without having to remove the sensor 12 from the sensor housing 14. Therefore, this eliminates any potential displacement error associated with replacing the eddy current sensor 12 within the sensor housing 14.

Referring back to FIG. 1, a method of measuring a thickness 26 of a nonconductive coating 24 over a portion of the intersection of the first and second conductive surfaces 20, 22 with a thickness measurement gauge 10 is provided. The first step includes placing the eddy current sensor 12 in contact with the coating 24 at a predetermined angular orientation with respect to first and second surfaces 20, 22. The longitudinal axis of measurement 19 of the sensor 12 is at an angle to both first and second surfaces 20, 22. The magnetic field generated by the eddy current sensor 12, as previously described, induces eddy currents in the first and second conductive surfaces 20, 22. The eddy currents cause an opposing magnetic field. As such, the induced eddy currents are optimum (that is each contributes uniformly to the opposing magnetic field) when the measurement axis 19 is substantially at similar angles to each conductive surface 20, 22. However, if conductivities differ it may be more advantageous to change the longitudinal axis of measurement 19 orientation by placing the axis at a smaller angle with respect to one surface rather than the other. For example, if the conductivity of the first surface 20 is less than that of the second surface 22, placing the longitudinal axis of measurement 19 at a larger angle (but still less than perpendicular) to the first surface may negate some of the effects of the lower conductivity of the first surface 20 due to its smaller contribution to the opposing magnetic field.

The sensor 12 provides an output based on the impedance change due to the sum of the magnetic fields. As the sensor 12 is in contact with the coating 24, the distance from the intersection corresponds to the thickness 26 of the coating 24. The electronic analyzer 40, therefore, provides a relevant output based on that distance. The output may be in electronic terms, such as millivolts, or calibrated to distances measured, such as microns and millimeters. Therefore, the next step of the method includes determining a measurement output of the thickness measurement gauge, which in this embodiment is provided by the electronic analyzer.

As the output of the thickness measurement gauge has been determined, the thickness 26 of the coating 24 may be determined from the output. The magnitude of the sensed field is proportional to the distance of the sensor from the conductive surfaces. The coating 24 is nonconductive, and, therefore it has a negligible effect on the magnetic fields, and as such it is only the distance from the intersection of first and second surfaces 20, 22 that the measurement gauge is actually sensing. Therefore, in this embodiment, the eddy current sensor 12 is placed in contact with at least a portion of the coating 24. The coating 24 is typically disposed with a concave surface and the sensor 12 cannot contact all of the coating, thus causing an air gap between portions of the sensor 12 and the coating 24. The concavity of the coating 24, however, is known permitting the additional distance due to the air gap to be eliminated from the final thickness determination. Eliminating the air gap consideration may be accomplished by physically measuring the concavity with a feeler gauge or the like, or, as described in more detail below, by calibration procedures that compensate for the air gap.

According to one embodiment, the thickness measurement gauge provides a measurement output that is compared with a predetermined output. For example, the predetermined output may correspond to the minimum desired thickness of the coating. In that case, the predetermined output may be linearly approximated through a range of distances about that predetermined output. Therefore, the output may be compared to the linear approximation to determine the actual thickness.

This embodiment of comparing the measurement output to a predetermined output may be used in conjunction with a pass/fail test. As it is determined that the predetermined output corresponds to a minimum thickness and any value less than the output is provided (assuming a positive slope of the output with respect to distance) then any value less than the output is a fail. Any value greater than the output is a pass, if no maximum thickness is required.

The predetermined output may be determined a variety of ways, and one method includes calibration to the minimum thickness in a calibration stand, such as described above. In the embodiments of a thickness gauge described above, the KDM-8200 facilitates such a calibration permitting the operator to define the linear approximations and predetermined output. Calibration procedures for establishing the desired linear approximation are provided in KDM-8200 Instruction Manual, Part No. 860059-001 Rev. F, the teachings of which are hereby incorporated by reference. Other analyzers include similar specific calibration procedures, which will be substituted accordingly.

Referring once again to FIG. 7, a method of calibrating a thickness measurement gauge having an eddy current sensor 12 disposed in a sensor housing 14 is provided. The sensor 12 is placed at a predetermined angular orientation with respect to third and fourth conductive surfaces 84, 86. The predetermined angular orientation is the same angular orientation that the sensor 12 will be placed relative to the first and second conductive surfaces 20, 22 that have a coating 24. The third and fourth conductive surfaces 84, 86 have conductivities that correspond to the conductivities of the first and second surfaces 20, 22, respectively. Generally, this may mean that the conductivities of the third and fourth surfaces 84, 86 are equivalent to the conductivities of the first and second surfaces 20, 22, respectively. As such, the calibration procedures most accurately approximate the actual measurement.

However, the conductivities of the third and fourth surfaces 84, 86 may vary with respect to the conductivities of the first and second surfaces 20, 22 so long as the proportion of variance is the same for each so that the variation can be accounted for by calibration procedures, otherwise it is advantageous to ensure that the conductivities are substantially equivalent.

As is often the case, the first and second surfaces 20, 22 may be the same material and conductivity and, therefore, the v-block 82 may also include third and fourth surfaces 84, 86 comprised of the same material and conductivity. As such, the v-block 82, as illustrated in FIG. 7, may comprise a single piece of material and typically, the same material as the first and second surfaces 20, 22.

The next step of the method includes positioning the sensor 12 to a predetermined distance from the third and fourth surfaces 84, 86. When using a calibration block, this comprises adjusting the positioner 88 so that third and fourth surfaces 84, 86 are moved toward the sensor holder 99. Alternatively, positioning the sensor 12 may also comprise moving the sensor housing 14 and holder 99 toward third and fourth surfaces 84, 86. The predetermined distance from the third and fourth surfaces 84, 86 corresponds to the distance to the minimum thickness of a coating 24 over first and second surfaces 20, 22. As explained earlier, the concavity of the coating 24 may require that the sensor be positioned at a distance from the intersection of the first and second surfaces 20, 22 that is greater than the minimum thickness. At that predetermined distance the thickness measurement gauge may be calibrated to a predetermined output.

Referring to FIG. 8, one advantageous method of determining the predetermined distance is to place a nonconductive coating 104 over third and fourth surfaces 84, 86. This nonconductive coating 104 may be carefully measured to the minimum desired thickness and have substantially the same concavity as is expected from the concavity of the coating 24 over first and second surfaces 20, 22. As such, the sensor 12 may be positioned to be in contact with at least a portion of the coating 104 in a similar manner to the expected contact with a coating 24 over first and second surfaces 20, 22.

As in the previously described embodiments, calibration may comprise adjusting the linearity, zero, and gain of the electronic analyzer so that the output is linearly approximated about the distance corresponding to the minimum thickness. Calibration of the thickness gauge in this manner may be used in one embodiment to calibrate the thickness gauge to a predetermined output that corresponds to a pass/fail test for minimum thickness. The predetermined output is selected so that it corresponds to the minimum thickness, while taking into account the concavity of the coating. For an output that is a positive slope any greater than the output is a pass.

Therefore, embodiments of a thickness measurement gauge, calibration stand, and methods of calibrating and measuring with thickness measurement gauge are provided. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A thickness measurement gauge, comprising:
   a sensor housing defining a first sidewall on the exterior of the housing such that the first sidewall permits the housing to abut a first surface proximate to a measurement area, said sensor housing further defining a second sidewall disposed at an angle to the first sidewall and configured to permit the sensor housing to abut a second surface proximate to the measurement area;
   an eddy current sensor adapted to be electrically interconnected with an electronic analyzer, the eddy current sensor being disposed in the housing and defining a longitudinal axis of measurement corresponding to magnetic fields generated by the eddy current sensor, wherein the axis of measurement extends through the angle defined between the first and second sidewalls at a non-perpendicular angle to the first sidewall and to the second sidewall; and
   an electronic analyzer electrically interconnected to the eddy current sensor and adapted to analyze an electrical signal from the eddy current sensor corresponding to a distance from a conductive surface.

2. The thickness measurement gauge according to claim 1, wherein the housing comprises a nonconductive enclosure.

3. The thickness measurement gauge according to claim 1, wherein the electronic analyzer further comprises a calibration circuit.

4. The thickness measurement gauge according to claim 3, wherein the calibration circuit includes a bridge network electrically interconnected to the eddy current sensor.

5. The thickness measurement gauge according to claim 1, wherein the eddy current sensor is disposed between the first and second sidewalls such that the axis of measurement is at a similar angle with respect to both first and second sidewalls.

6. The thickness measurement gauge according to claim 5, wherein the housing defines the first and second sidewalls such that first and second sidewalls are perpendicular to each other.

7. The thickness measurement gauge according to claim 1, wherein the electronic analyzer is independent of the housings.

8. The thickness measurement gauge according to claim 7, wherein a lead from the housing to the analyzer electrically interconnects the sensor and electronic analyzer.

9. The thickness measurement gauge according to claim 1, further comprising a battery power supply interconnected to the electronic analyzer.

10. The thickness measurement gauge according to claim 1, wherein the first sidewall defines a recessed portion.

11. The thickness measurement gauge according to claim 1, wherein the first and second sidewalls cooperate to define a beveled corner.

12. A thickness measurement gauge, comprising:
a sensor housing;
an eddy current sensor disposed in the housing;
a pressure enclosure hermetically sealed to permit a pressure within the enclosure to exceed an ambient pressure;
an electronic analyzer disposed in the pressure enclosure and electrically interconnected to the eddy current sensor and adapted to analyze an electrical signal from the sensor;
an electrical connector hermetically sealed about the pressure enclosure and electrically interconnected to the electronic analyzer; and
at least one lead proceeding from the connector to the eddy current sensor and electrically interconnecting the eddy current sensor and the electronic analyzer.

13. The thickness measurement gauge according to claim 12, further comprising a power source for energizing the electronic analyzer.

14. The thickness measurement gauge according to claim 13, wherein the power source comprises a battery disposed within the pressure enclosure.

15. The thickness measurement gauge according to claim 13, wherein the power source is disposed within the pressure enclosure.

16. The thickness measurement gauge according to claim 12, wherein the pressure enclosure further comprises an automatic pressure relief valve.

17. The thickness measurement gauge according to claim 12, wherein the pressure enclosure further comprises a manual pressure relief valve.

18. The thickness measurement gauge according to claim 12, wherein the housing comprises a nonconductive enclosure.

19. A thickness measurement gauge, comprising:
a sensor housing;
an eddy current sensor disposed in the housing;
a pressure enclosure hermetically sealed to permit a pressure within the enclosure to exceed an ambient pressure;
an electronic analyzer disposed in the pressure enclosure and electrically interconnected to the eddy current sensor and adapted to analyze an electrical signal from the sensor;
a power source for energizing the electronic analyzer; and
a pressure switch electrically interconnected between the power source and the electronic analyze, the pressure switch adapted to disconnect the electronic analyzer and power source upon pressure within the pressure enclosure falling below a predetermined threshold further comprising a power source for energizing the electronic analyzer.

20. The thickness measurement gauge according to claim 19, further comprising a bulkhead fitting through the pressure enclosure pneumatically interconnected to the pressure relief switch.

21. A thickness measurement gauge, comprising:
a sensor housing;
an eddy current sensor disposed in the housing;
a pressure enclosure hermetically sealed to permit a pressure within the enclosure to exceed an ambient pressure;
an electronic analyzer disposed in the pressure enclosure and electrically interconnected to the eddy current sensor and adapted to analyze an electrical signal from the sensor; and
a pressure gauge for displaying a pressure reading corresponding to a pressure within the pressure enclosure.

22. The thickness measurement gauge according to claim 21, further comprising a bulkhead fitting through the pressure enclosure pneumatically interconnected to the pressure gauge.

23. A thickness measurement gauge, comprising:
a sensor housing;
an eddy current sensor disposed in the housing;
a pressure enclosure hermetically sealed to permit a pressure within the enclosure to exceed an ambient pressure;
an electronic analyzer disposed in the pressure enclosure and electrically interconnected to the eddy current sensor and adapted to analyze an electrical signal from the sensor; and
an output display in communication with the electronic analyzer for providing a display corresponding to the output of the thickness measurement gauge.

24. A thickness measurement gauge, comprising:
a sensor housing;
an eddy current sensor disposed in the housing;
a pressure enclosure hermetically sealed to permit a pressure within the enclosure to exceed an ambient pressure; and
an electronic analyzer disposed in the pressure enclosure and electrically interconnected to the eddy current sensor and adapted to analyze an electrical signal from the sensor, wherein the pressure enclosure further comprises an air valve adapted to be connected to a pneumatic pressure source.

25. The thickness measurement gauge according to claim 24, wherein the air valve is a schrader valve.

26. A thickness measurement gauge, comprising:
a sensor housing;
an eddy current sensor disposed in the housing;
a pressure enclosure hermetically sealed to permit a pressure within the enclosure to exceed an ambient pressure;
an electronic analyzer disposed in the pressure enclosure and electrically interconnected to the eddy current sensor and adapted to analyze an electrical signal from the sensor, wherein the electronic analyzer further comprises a calibration circuit.

27. The thickness measurement gangs according to claim 26, wherein the calibration circuit includes a bridge network electrically connected to the sensor.

* * * * *